United States Patent Office 3,428,656
Patented Feb. 18, 1969

3,428,656
METHOD FOR PRODUCING THE DERIVATIVES
OF 6-HYDROXYCAPROIC ACIDS
Francis J. Weiss, Pierre-Benite, France, assignor to Ugine
Kuhlmann, Paris, France, a French company
No Drawing. Continuation-in-part of application Ser.
No. 361,573, Apr. 21, 1964. This application Feb.
6, 1967, Ser. No. 614,014
Claims priority, application France, Feb. 7, 1966,
48,652
U.S. Cl. 260—343       19 Claims
Int. Cl. C07d 9/00; C07c 49/30

ABSTRACT OF THE DISCLOSURE

Derivatives of 6-hydroxycaproic acids are produced by reacting a cyclohexanone with hydrogen peroxide and formic acid at a temperature in the range between 0° and 100° C. The cyclohexanone suitable for the process has the general formula:

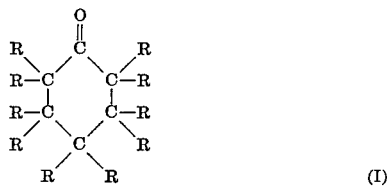

wherein any one of the R's can be a hydrogen atom, an alkyl or a cyclic alkyl. The derivatives of 6-hydroxycaproic acids thus obtained are predominately ε-caprolactone of the formula

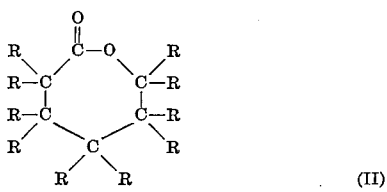

and 6-formyloxycaproic acid of the formula

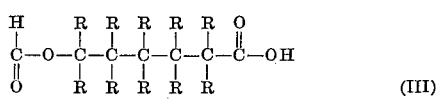

Each of the R's in the Formulas II and III corresponds to the R in the Formula I.

When the reaction is carried out by adding progressively $H_2O_2$ to a mixture of formic acid and a cyclohexanone at a temperature in the range of 40°–100° C., the products of the reaction have a greater amount of 6-formyloxycaproic acid than ε-caprolactone. Conversely, when the reaction is carried out by adding a cyclohexanone to a reaction mixture of $H_2O_2$ and formic acid and the reaction temperature is maintained at a range between 0° and 40° C., ε-caprolactone predominates in the products.

A small amount of peroxides of cyclohexanone produced by simultaneous parasitic reactions is removed advantageously from the reaction mixture by adding hereto a solvent for said peroxides such as carbon tetrachloride which is substantially insoluble in and immiscible with the reaction medium. During the reaction, the small amount of peroxides thus formed is effectively removed by preferentially dissolving in the solvent therein. The amount of the solvent used ranges from 0.1 to 1.0 times the amount of formic acid used for the reaction.

CROSS-REFERENCE TO RELATED APPLICATION

This application is a continuation-in-part of my application Ser. No. 361,573 filed Apr. 21, 1964, now abandoned.

BACKGROUND OF THE INVENTION

Field of the invention

This invention relates to a process for producing derivatives of 6-hydroxycaproic acids by oxidizing a cyclohexanone with hydrogen peroxide in the presence of formic acid.

Description of the prior art

The oxidation of cyclohexanones with peracids such as peracetic, perbenzoic, trifluoroperacetic, perphthalic acids to produce ε-caprolactones, is known. This type of process generally gives good yields when the peracid used is in an anhydrous solution (J. Am. Chem. Soc. 1958, 80, 4079; 1949, 71, 2571; 1955, 77, 188: et Helv. Chim. Acta. 1949, 32, 973: French Patent 1,160,882). The organic peracids, however, are expensive reagents particularly when they must be in an anhydrous solution. It has been proposed to use the acetaldehyde monoperacetate as an oxidizing agent or simultaneously oxidizing a cyclohexanone and an aliphatic aldehyde with oxygen (French Patent 1,300,782) in the presence of a catalyst to produce ε-caprolactone and a carboxylic acid. In general, the yield of ε-caprolactone on the basis of the converted cyclohexanone is satisfactory. The conversion rate of the cyclohexanone, however, ranges only between 14 to 61% even with an excess of aldehyde and oxygen which leads to the inevitable coproduction of carboxylic acid in excess of about 2.5 to 4 times that of the theoretical yield.

The action of the inorganic peracid such as Caro's acid (persulfuric acid), or of hydrogen peroxide in the presence of either reactive inorganic acids and compounds such as concentrated sulfuric acid, anhydrous hydrofluoric acid, selenic acid or sodium hydroxide, and ferric and ferrous salts in an aqueous medium or alcoholic aqueous media, produces 6-hydroxycaproic esters and acids with relatively poor yield. Indeed, it is often that only high molecular weight polymeric products are obtained. In this connection, it was observed that the ε-caprolactones are unstable in the presence of strong inorganic and organic acids, and similarly in the presence of inorganic compounds such as water, hydrogen peroxide, and salts. (Journal of American Chemical Society 1958, vol. 80, p. 4079.)

U.S. Patent No. 2,904,584 discloses a method to oxydize the cycloalkanones by means of peractic acid in the presence of a cation exchange resin. The peracetic acid is prepared by reacting aqueous hydrogen peroxide and acetic acid. By introducing the cyclohexanone gradually into the mixture of the peracid and the cationic resin at 75° C., a mixture of 6-acetoxycaproic acid, 6-hydroxycaproic acid, and adipic acid is obtained. The preliminary preparation and the heating of the peracid to a relatively high temperature present substantial difficulties due to the instability of this material, both with respect to safety of the process and with the yield of the oxidation step. Furthermore, the process requires the use of a relatively large quantity of expensive cation exchange resin as a catalyst.

It has also been reported that, in reacting cyclohexanone with 85% aqueous hydrogen peroxide in the presence of trifluoroacetic acid, only the corresponding peroxides are obtained. Under similar operating conditions, a satisfactory yield of ε-caprolactones is obtained reacting trifluoroperacetic acid with cyclohexanone. (Journal of American Chemical Society 1955, vol. 77, page 188.)

These prior arts indicate that the preliminary formation of an organic peracid was a necessary condition for producing the derivatives of the 6-hydroxycaproic acids, and that using a readily available oxidizing agent, hydrogen peroxide, normally fails to yield a satisfactory amount of ε-caprolactones in a simple reaction.

SUMMARY OF THE INVENTION

I have, however, made the surprising discovery that direction action of hydrogen peroxide with a cyclohexanone in the presence of formic acid produces very high yields of derivatives of the corresponding 6-hydroxycaproic acids particularly the ε-caprolactones and 6-formyloxycaproic acids, without using a catalyst. In accordance with the present invention, the method of producing derivatives of 6-hydroxycaproic acids comprises reacting a cyclohexanone with hydrogen peroxide and formic acid at temperature in the range of 0°–100° C. The cyclohexanone has the structural formula:

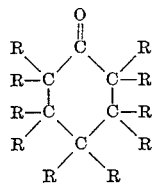

wherein any one of the R's can be a hydrogen atom, an alkyl or a cyclic alkyl, such as for example, methyl, ethyl, propyl, isopropyl, butyl, isobutyl, t-butyl, octyl, dodecyl, cyclohexyl, etc. The molar ratio of formic acid to hydrogen peroxide used in the reaction is at least about one and the molar ratio of hydrogen peroxide to cyclohexanone used in the reaction is about 0.1 to about 2. The derivatives of 6-hydroxycaproic acids recovered from the reaction are predominately ε-caprolactone and 6-formyloxycaproic acid which have the following structural formulas respectively:

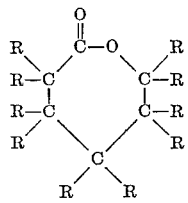

and

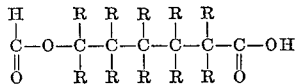

wherein each of the R's corresponds to the R's in the cyclohexanone.

The proportion of 6-formyloxycaproic acid and ε-caprolactone in the final product of the reaction in accordance with the present invention varies depending on primarily the reaction temperatures and the reaction procedures. I have found that by progressively adding hydrogen peroxide to a mixture of formic acid and a cyclohexanone at temperature in the range of 40°–100° C., the product is predominately 6-formyloxycaproic acid. Lowering the reaction temperature to between 0°–40° C. and by adding cyclohexanone into a reaction mixture of hydrogen peroxide and formic acid which have been partially reacted to form performic acid, the product obtained is predominately the corresponding ε-caprolactone. These derivatives of 6-hydroxycaproic acids can be further transformed into esters, amides, nitriles, etc., by using the well-known processes such as esterification, transesterification, etc.

A small amount of peroxides of cyclohexanone which may be produced by simultaneous parasitic reactions is removed advantageously from the reaction mixture by adding thereto a solvent for said peroxides which is substantially insoluble in and immiscible with the reaction medium. The small amount of peroxides produced by the parasitic reactions during the reaction is dissolved preferentially into the solvent and is subsequently removed from the other reaction products by separating the substantially immiscible solvent from the reaction medium. The amount of solvent that can be used is in the range between 0.1 to 1.0 times the amount of formic acid used. Additional solvent extraction operation can be used for removing the remaining peroxides of cyclohexanone.

By adding a solvent of peroxides of cyclohexanone into the reaction mixture, I have successfully overcome the shortcomings encountered due to the precipitation of said peroxides. The shortcomings are caused by the limited solubility of the peroxides. Crystallization of the peroxides, therefore, often occurs which may cause clogging in the piping system, particularly in the joints. The crystal participates may also deposit on the wall of the reactor as a result of which the thermal transfer efficiency is reduced.

By removing the peroxides of cyclohexanone in the manner described, the contamination of the crude products by them is substantially reduced. This has the additional advantage of reducing the probability of the occurrence of a violent thermal decomposition during the final distillation to purify the crude products due to the presence of said peroxides.

DESCRIPTION OF THE PREFERRED EMBODIMENTS

For producing the derivatives of 6-hydroxycaproic acids containing predominately 6-formyloxycaproic acid, the preferred method comprises progressively adding hydrogen peroxide to a mixture of formic acid and a cyclohexanone. The exothermic reaction starts immediately. It is, therefore, important that the addition rate of $H_2O_2$ be properly regulated according to the reaction conditions, so that the hydrogen peroxide can be consumed as introduced to avoid having a high concentration of hydrogen peroxide or other peroxidic compounds, such as performic acid, in the reaction medium. The reaction may thus be carried out in the best safety conditions and without any loss of hydrogen peroxide by decomposition. Normally, at the end of the introduction of the given quantity of hydrogen peroxide, the reaction is substantially completed. Additional time, if needed, may be used to insure the complete reaction.

The constituents of the reaction mixture are separated by fractional distillation or by any means, such as by extraction with a solvent.

Hydrogen peroxide can be conveniently added into the reaction in the form of an aqueous solution. The concentration of this peroxide solution is not critical. For example, aqueous solutions containing 30 to 90% by weight of $H_2O_2$ can be used. More diluted hydrogen peroxide can also be used, but will not present any economical advantage. The amount of hydrogen peroxide required for the reaction may range between 0.1 to 2 mols per mol of cyclohexanone, with the optimum amount in the range of 0.5 mol to 1.25 mol. A larger amount of hydrogen peroxide is not needed because the unconverted excess is difficult to recover. Furthermore, it can cause secondary oxidation reactions.

The formic acid may be used in an anhydrous or aqueous form, preferably with a concentration of 75% to 100% by weight. The amount of formic acid used in the reaction must be at least equal to 1 mol of HCOOH per mol of $H_2O_2$ and preferably using more than 2 mols of HCOOH per mol of $H_2O_2$. Using formic acid less than 1 mol per mol of $H_2O_2$, however, still produces a very satisfactory yield, although, under these conditions, a certain amount of peroxides of cyclohexanone are formed, which crystallize as insoluble crystals and require filtering for their removal, advantageously by using a solvent for said peroxides in the manner described. There is no upper limit to the amount of formic acid that can be added into the reaction. It is advantageous to use 5 to 30 mols of formic acid per mol of hydrogen peroxide.

The reaction temperature may be chosen between 0° and the boiling point of the mixture, preferably between 40 and 90° C. Hydrogen peroxide may be added at a lower temperature, then increasing the temperature, for example, to the boiling point, when the $H_2O_2$ addition is over. Depending on the reaction temperature, the addition of the hydrogen peroxide may vary from ½ hour to 2 hours and the total reaction time may vary from about 1½ hours to 4 hours. This reaction is conducted preferably at the atmospheric pressure, but a reduced pressure is also suitable to allow the mixture to react at boiling temperature.

Batch as well as continuous process may be used. In this latter case, a series of agitated reactors arranged in cascade, for example, can be used. In such a process, the cyclohexanone and the formic acid are introduced in the first reactor and the hydrogen peroxide may be either introduced completely in the first reactor or distributed between two successive reactors or more.

To produce derivatives of 6-hydroxycaproic acids containing predominately ε-caprolactone according to the method of the invention, a mixture of formic acid and hydrogen peroxide in aqueous solution, preferably, is prepared first. This mixture is left in contact at a temperature between 0 and 40° C. which proceeds rapidly at ambient temperature and without a catalyst to form an equilibrium solution containing performic acid. It is preferred that this mixture be allowed to react for a period sufficient to form the performic acid prior to the addition of cyclohexanone, which eliminates to some extent the parasitic reactions forming peroxides of the cyclic ketone. It is, however, not necessary for the mixture to reach equilibrium before the addition of cyclohexanone. I have found that addition can be made when 20 to 80% of $H_2O_2$ is converted into a peracid to avoid almost completely the undesirable secondary reactions. When this precaution is taken, only performic acid will react with the ketone to form the corresponding lactone. The consumption of performic acid promotes the unreacted $H_2O_2$ to react with the excess formic acid to form the performic acid in the equilibrium reaction. Therefore, the preliminary reaction between $H_2O_2$ and the formic acid may continue through a period from 0.5 to 4 hours at a temperature between 0° and 40° C.

In order to promote formation of the peracid, an excess of formic acid should be used with respect to $H_2O_2$, 2 to 30 moles of formic acid per mole of $H_2O_2$ give a satisfactory result. This excess acid also serves as a solvent and a diluent, which promotes the formation of a stable performic acid between 0° and 40° C. The two reactants may be used either in the pure form or in an aqueous solution. Since the water has the effect of limiting the equilibrium in the formation of performic acid according to the reaction

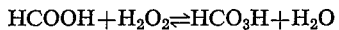

$$HCOOH + H_2O_2 \rightleftharpoons HCO_3H + H_2O$$

it is preferable to employ concentrated reactants, such as a hydrogen peroxide solution containing 30 to 90% by weight of $H_2O_2$ and a formic acid solution containing between 75 and 100% by weight of HCOOH which are commercially available.

The reaction between perforic acid mixture and cyclohexanone should be carried out at a temperature not exceeding 40° C., preferably between 10° and 30° C. The proportions of cyclohexanone and the $H_2O_2$ initially introduced into the reaction may vary within a wide limit. It is, however, preferable to operate in the vicinity of the stoichiometric quantities, with a molar ratio of cyclohexanone to $H_2O_2$ between about 0.7 and 2. There is no advantage in utilizing a lower ratio, which would result in an increased consumption of hydrogen peroxide, the excess of which is not practically recoverable. In contrast, a greater excess of cyclohexanone can be used without disadvantage. As much as 5 mols per mol of $H_2O_2$ can be used.

The reaction is highly exothermic, which may be carried out in a batch-wise fashion with progressive addition of cyclohexanone to the mixture containing the performic acid, or vice versa. Alternatively the two reactants may be added simultaneously to a starting quantity of the reactant mixture, in an autoclave having mixer and a powerful refrigerating means. The speed of addition or the rate at which the reactants may be added depends primarily on the capacity of the refrigerating means in holding the temperature at the desired level. The oxidation reaction itself is almost instantaneous.

The reaction may also be carried out in a continuous process such as in a series of reaction vessels arranged in cascade, with $H_2O_2$ and formic acid being introduced into a first vessel whose dimensions are so chosen as to insure a holding time therein sufficient to form the desired portion of performic acid and the cylcohexanone being introduced into a second reaction vessel. A third vessel may, if desired, be employed to allow the reaction to be completed. The process may be carried out in the presence of an inert diluent, particularly when the lactone is to be subsequently separated by extraction as set forth hereinbelow, in which case the extraction solvent may itself perform the function of a diluent.

I prefer to use as a diluent, a solvent or a mixture of solvents which are also solvents for the peroxides of cyclohexanone. The use of such a diluent has the added advantage, as mentioned hereinabove, of dissolving the peroxide of cyclohexanone. Thus the process is, in fact, a combination of chemical reactions in which the hexanone is oxidized and a simultaneous physical operation wherein the diluent is used in a liquid-liquid solvent extraction for the preferential removal of the undesirable peroxides of cyclohexanone as they are produced. If necessary, additional fresh solvent for the peroxides may be used to extract the trace amount of residual peroxide. In a continuous process using a series of cascade reactors, the fresh solvent, preferably, is introduced therein in a counter-current flow arrangement wherein the fresh solvent is introduced in the final reactor.

Suitable solvents for this process include the aliphatic, alicyclic and aromatic hydrocarbons as well as their halogenated and nitrogenated derivatives. Examples of these solvents are pentane, hexane, n-heptane, cyclohexane, benzene, toluene, xylene, methylene chloride, chloroform, carbon tetrachloride, dichloroethane, trichloroethylene, tetrachloroethylene, trifluorotrichloroethane, chlorobenzene, dichlorobenzenes, and nitrobenzene.

The ε-caprolactone produced in the process of this invention may be recovered in any suitable manners. It is desirable to separate the ε-caprolactone from the reaction mixtures, if possible, as it is produced. For example, the caprolactone may be recovered by condensing the vapors evolved from the reactor. At the reaction temperature, which is below about 40° C., the speed of recovery, however, is very slow. A more practical approach is to separate the ε-caprolactone from the reaction mixture as soon as the reaction is completed and without allowing the reactive mixture to stand at a temperature about 40° C. A thin film evaporation technique at a reduced temperature, for example, can be used to recover the product without exposing it to a prolonged contact with the formic acid and water at the boiling temperature. It is also possible to use a liquid-liquid extraction technique for the separation. If a common solvent for the peroxides of cyclohexanone and ε-caprolactone is used for the preferential removal of said peroxides, a more selective solvent may be used for the extraction of ε-caprolactone after the peroxides of cylcohexanone is substantially extracted. The separation is carried out preferably at ambient temperature.

The suitable solvents for the extraction of ε-caprolactone include the aliphatic, alicyclic and aromatic hydrocarbons and also their halogenated and nitrated derivatives. For example, pentane, hexane, n-heptane, cyclohexane, benzene, toluene, xylenes, methylene chloride, chloroform, carbon tetrachloride, dichlorethane, trichlorethylene, tetrachlorethylene, chloro-fluorinated derivatives of methane and ethane such as, for example, trifluoro-trichloroethane, chlorobenzene, dichloro benzenes, and nitrobenzene, and found to be eminently suitable. After the neutralization of the extract, the $\epsilon$-caprolactone is separated from the solvent by simple fractional distillation.

The $\epsilon$-caprolactones produced according to the process of the invention may be employed for different purposes in chemical synthesis or polyester production.

Further to illustrate the invention specific examples are described hereinbelow.

EXAMPLE I

Preparation of 6-formyloxycaproic acid

It was added drop by drop within 2 hours:

50 g. of 83.5% aqueous hydrogen peroxide (1.23 mol) to a mixture of:
98 g. of cyclohexanone (1 mol), and 340 g. of formic acid (7.4 mols)

and the temperature was maintained at 60–65° C. After the addition, the preparation was heated for one additional hour in a boiling water bath. The reaction mixture then was put into a distillation apparatus, and after excess water and formic acid were evaporated under 150–200 mm. Hg, the reaction product was distilled under 1 to 3 mm. Hg 132 g. of colorless distillate which crystallizes when cooling are obtained:

$Eb_1$: 113–116° C.
F.: 28.5–29° C.

The titrations by acidimetry and by saponification show that 6-formyloxy caproic acid having a purity of 98.8 to 99.6% is obtained. The yield is 82.5% of the theoretical based on the starting cyclohexanone.

6.5 g. of distillate of adipic acid (yield: 4.5% of the starting cyclohexanone) was also collected when distillation continued further. 13 g. of a residue mainly polyesters of 6-hydroxy caproic acid were left.

EXAMPLE II

The procedure of Example I was repeated, but using 48.7 g. of 70% aqueous hydrogen peroxide (1.0 mol) 123 g. of 6-formyloxy caproic acid with a yield of 76.5% of the theoretical based on the starting cyclohexanone was obtained.

EXAMPLE III

Under the same conditions as in Example I, a series of experiments were conducted using 1.05 mol of hydrogen peroxide per mol of cyclohexanone, but using the aqueous hydrogen peroxide of various concentrations. The following results were obtained:

DISTILLED 6-FORMYLOXY CAPROIC ACID

| | Weight, gr. | Yield (percent of theory) |
|---|---|---|
| With 51 g of 70% hydrogen peroxide | 130 | 81.3 |
| With 71.5 g of 50% hydrogen peroxide | 125 | 78.2 |
| With 119 g of 30% hydrogen peroxide | 117 | 73.2 |

EXAMPLE IV

It was added, drop by drop, within 3 hours:

42.7 g. of 83.5% aqueous hydrogen peroxide (1.05 mol) to a mixture of:
98 g. of cyclohexanone (1 mol)
57.5 g. of formic acid (1.25 mol)

and the temperature was maintained at 60–65° C. To the end of the addition, a crystalline precipitate appeared. Upon completion of the hydrogen peroxide addition, the mixture was raised to 90–95° C. for one hour; then the crystalline product was cooled down and filtered, and washed with 20 cm.³ of methanol. 17 g. of colorless product was collected melting at 127–128° C. The infra-red spectrum indicated that dicyclohexylidene diperoxide (Flitt: 127–130° C.) was obtained which corresponded to 0.074 mol, i.e. 14.8% of the cyclohexanone used.

The filtrate was distilled and after the excess water and formic acid were eliminated, it was collected:

12.8 g. of untransformed cyclohexanone (0.13 mol)
11 g. of $\epsilon$-caprolactone (0.09 mol), $Eb_1$: 60–70° C.
47 g. of 6-formyloxy caproic acid (0.29 mol)
7.5 g. of adipic acid (0.05 mol)

The undistilled residue was 29 g.

EXAMPLE V

It was added drop by drop, within 1 hour:

102 g. of 70% aqueous hydrogen peroxide (2.1 mols) to a mixture of:
196 g. of cyclohexanone (2 mols)
1100 g. of formic acid (24 mols)

while cooling down the mixture in order to maintain it at at 60–70° C.

After the addition, the reaction mixture was heated again for one hour at the same temperature and then distilled as usually.

277 g. of 6-formyloxy caproic acid (86.5% of the theoretical yield) was obtained. 26 g. of a residue constituted of adipic acid and polyesters were left.

EXAMPLE VI

It was added drop by drop:

18 g. of 83.5% aqueous hydrogen peroxide (0.44 mol) within 2 hours and a half to a mixture of:
49 g. of cyclohexanone (0.5 mol) and
170 g. of formic acid (3.7 mols)

while cooling down the mixture in order to maintain it at 45° C.; the mixture was maintained at the same temperature for 15 minutes, then cooled to 20° C. 16 g. of the crystalline cyclohexanone peroxide (F.: 130–130.5°) was obtained. The filtrate has then been distilled as usual, which consisted of:

10.3 g. of the untransformed cyclohexanone (0.105 mol)
4.9 g. of $\epsilon$-caprolactone (0.043 mol).
24.8 g. of 6-formyloxy caproic acid (0.155 mol).

EXAMPLE VII

The procedure of the Example V was repeated, but with 24 mols of formic acids per mol of starting cyclohexanone. 284 g. of 6-formyloxy caproic acid (1.77 mol) were obtained.

Consequently the yield raised to 88.5% of the theoretical yield based on the starting cyclohexanone.

EXAMPLE VIII

It was added progressively within 2 hours:

67 g. of 83.5% aqueous hydrogen peroxide (1.65 mol) to a mixture of
210 g. of 3–3–5 trimethyl cyclohexanone (1.5 mol)
510 g. of formic acid (11.1 mols)

and the temperature was maintained between 63 and 68° C. After the addition, the mixture was heated to 95° C. for one hour and the water and the formic acid was distilled under reduced pressure, as in the Example I. The remaining mixture was subjected to a fractional distillation under about 1 mm. Hg pressure:

34.2 g. of untransformed 3–3–5 trimethyl cyclohexanone (0.245 mol) and
102 g. of a mixture of 3–3–5 trimethyl caprolactone and 3–5–5 trimethyl caprolactone (0.654 mol) were obtained;

$Eb_2$: 80–87° C. (Flitt: $Eb_4$ (103° C.))
$n_D^{20}$: 1.4590 (Flitt $n_D^{30}$: 1.4566)
$d_4^{20}$: 0.998

The analysis by saponification showed a purity of 98.3%. The trimethylcaprolactone yield reached 52% of the theoretical yield based on the converted 3-3-5 trimethyl cyclohexanone.

81 g. of a mixture of 6-formyloxy 3-3-5 trimethyl caproic acid and 6-formyloxy 3-5-5 trimethyl caproic acid (0.40 mol)

$Eb_2$: 120–130° C.;
$n_D^{20}$: 1.4530;
$d_4^{20}$: 1.060.

The titration by acidimetry showed a purity of 99.5%.

The yield in 6-formyloxy trimethylcaproic acids reached 32% of the theory.

Thus the total yield of the operation amounted to 84%.

EXAMPLE IX

Preparation of 6-hydroxy caproamide 80 g. of 6-formyloxy caproic acid (0.5 mol)
21 g. of anhydrous ammonia (1.24 mol)
100 cm.³ of dioxan were placed in an agitated autoclave having a capacity of 0.5 liter and they were heated at 200° C. for 3 hours. The obtained mixture was distilled, first under atmospheric pressure in order to eliminate the excess of ammonia and the dioxan, then under 2 mm. Hg:

19.1 g. of formamide (0.425 mol, i.e. 85% of the theory)
62.2 g. of 6-hydroxy caproamide (0.474 mol, i.e. 95% of the theory)

were obtained.

EXAMPLE X

Preparation of 6-hydroxy methyl caproate

A part of the 6-formyloxy caproic acid prepared in Example I was transformed into 6-hydroxy methyl caproate by heating and boiling:

16 g. of 6-formyloxy caproic acid (0.1 mol)
64 g. of methanol (2 mols)
0.2 g. of sulphuric acid.

The methyl formate produced by alcoholysis of the formyloxy function was distilled as it was formed. The reaction was over within 2 hours. After neutralizing and removal of the excess methanol by distillation under atmospheric pressure 6-hydroxy methyl caproate was distilled under reduced pressure.

13.9 g. of the product, i.e. 95% of the theory
$Eb_1$: 89–90° C. (literature indicates $Eb_2$: 88° C.)
$n_D^{20}$: 1.4380 (literature indicates $n_D^{30}$: 1.4344)
$d_4^{20}$: 1.0214
Hydrazide: F. 114°–115° after recrystallization in the methanol (literature indicates F. 114–118°)

were obtained.

EXAMPLE XI 516 g. of formic acid (11.2 mols)
65 g. of aqueous 83.5% hydrogen peroxide (1.6 mol) were placed in a 1 liter flask equipped with a stirrer and cooled by a water bath. This was allowed to stand for 2 hours at ambient temperature, and
147 g. of cyclohexanone (1.5 mol) was then introduced gradually in half-an-hour, while keeping the temperature at 20° C. After finishing this addition, the reaction was allowed to continue for half-an-hour, extraction then being performed ten times with 300 cm.³ of benzene, and the extracts were neutralized with sodium carbonate. After evaporation of the benzene, and distillation at 72° C.

144 g. ε-caprolactone was obtained (1.26 mol or 84% of theoretical yield). Approximately 5 g. was left behind as residue essentially formed by the cyclic di-mer of ε-caprolactone.

EXAMPLE XII

A series of comparative tests was performed to show the effect of preliminary formation of performic acid. The method of operation of Example XI was used, with the same quantities of reactants while keeping the temperature at 30° C. but varying the duration and temperature of the preliminary reaction between hydrogen preoxide and formic acid. In the test without preliminary reaction, the hydrogen peroxide was added at the same time as the cyclohexanone, into the flask containing the formic acid. After the reaction, the peroxide was filtered and the quantity of ε-caprolactone present in solution was determined by gas chromatography. The results shown in the following table were obtained:

| Test | Preliminary reaction $H_2O_2$+HCOOH | | Rate of conversion of the cyclohexanone (in percent of the quantity engaged) into— | |
|---|---|---|---|---|
| | Temp., °C. | Period, hours | Peroxides | Lactone |
| a | 20 | [1] 2 | 1.0 | 96.5 |
| b | 20 | 1 | 4.5 | 93 |
| c | 30 | [2] 0.5 | 4.0 | 91.5 |
| d | | 0 | 52 | 37 |

[1] Balance of the reaction was reached substantially.
[2] Balance would be reached in approx. one hour.

EXAMPLE XIII

Example X was repeated, but using 168 g. (1.5 mol) of a mixture of 2-methyl and 4-methyl cyclohexanones. By extraction with benzene and distillation of the neutralized benzenic extract 167 g. (1.3 mol) methyl -ε-caprolactones were obtained, boiling at 65–80° C. under 1 mm. Hg.

The yield amounted to 86.5% of theoretical.

EXAMPLE XIV

Example XI was repeated but using 200 g. (1.43 mol) of 3-3-5-trimethyl cyclohexanone and by operating at 30° C. Five portions of 400 cm.³ of xylene were then used to perform the extraction. After neutralization of the extracts, the xylene was distilled, then the mixture of trimethyl-ε-caprolactones, from which 196 g. was obtained (1.25 mol. or 87.5% of theoretical) boiling at 70° C.–75° C. under 0.5 mm. Hg.

EXAMPLE XV 48.5 g. of an aqueous solution of hydrogen peroxide was mixed with 348 g. of a 99% formic acid solution (1 mol of $H_2O_2$ to 7 moles of $HCO_2H$). After keeping this mixture at 20° C. for 2 hours, 98 g. of cyclohexanone and 128 g. of carbon tetrachloride were progressively introduced into the $H_2O_2$ and HCOOH mixture at the same temperature. At the end of an hour, the solution of carbon tetrachloride contained 7.3 g. of peroxides of cyclohexanone and 1.2 g. of caprolactone were separated from the aqueous reaction medium. Three additional extractions were made using 64 g. of $CCl_4$ in each case. An additional, 1.7 g. of peroxides was extracted therefrom together with 1.6 g. of ε-caprolactone. After this treatment, the reactive medium contained less than 0.05% by weight of peroxides. The ε-caprolactone was then extracted by means of ten consecutive extractions using 150 g. of benzene for each extraction. After neutralization and evaporation of these extracts, 94 g. of ε-caprolactone (82.5% of theoretical yield) was obtained by distillation at 70–75° C. under 1 mm. Hg.

EXAMPLE XVI

A continuous plant was used which comprises four series-mounted reactors equipped with agitators. Decanting vessels were used to separate the peroxide extract and one was connected to each of the outlets of the second, third and fourth reactors. The data referred to hereinafter are in parts by weight per hour. The first reactor was used to prepare a performic acid using 24.3 parts of a 70% aqueous solution of hydrogen peroxide and 174 parts of formic acid (99–100%). The reaction was allowed to proceed for 2 hours and after which the resulting mixture was fed into the second reactor. 49 parts of cyclohexanone and 64 parts of carbon tetrachloride solution were added to the second reactor gradually. After addition the carbon tetrachloride phase was decanted and removed therefrom. The reaction mixture was allowed to flow to the third reactor, and 32 parts of fresh carbon tetrachloride was introduced therein. After mixing with the reaction mixture the carbon tetrachloride phase was again separated and removed and the reaction mixture was fed to the last reactor, 32 parts of fresh carbon tetrachloride was added to the last reactor for extraction and the aqueous and the CCl₄ phases were separated in a same manner. The temperature was maintained at 20° C., during the process, in both the reactors and decanting vessels.

Analysis yielded the following results: the carbon tetrachloride solution decanted after the 2nd reactor contained 5.7% by weight of peroxides, and the combined extracts from the 3rd and 4th reactor contained 1.3% of the same. These solutions contained 1% of ε-caprolactone. The reaction mixture recovered after decanting from the 4th reactor contained less than 0.05% of peroxides, and the ε-caprolactone therein was 19.2% by weight.

This mixture was thereupon transferred into an evaporator of the descending film type, operating at the pressure of 55 mm. Hg., in which continuous separation of water, formic acid and non-reacted cyclohexanone was performed in a mixture distilling at 60–65° C. At the bottom of the evaporator, a temperature of approximately 120° C. was maintained, and 55 parts of a mixture in the liquid state was drawn off, which in addition to ε-caprolactone, contained ε-formyloxycaproic acid and polyesters. The pure ε-caprolactone was then obtained by renewed distillation of this mixture under reduced pressure.

EXAMPLE XVII

The operation was conducted in the same plant as in Example XVI using a counter current flow extraction method. The 1st reactor was fed with 24.3 parts of 70% aqueous solution of hydrogen peroxide and with 116 parts of formic acid (99%). 49 parts of cyclohexanone and a solution of peroxides in cyclohexane extracted from the decanting vessel situated at the outlet of the 3rd reactor, were fed into the second reactor which also was fed with the formic acid mixture from the first reactor. The 3rd reactor was fed with the decanted reaction mixture coming from the second reactor and with the decanted cyclohexane solution of peroxides from the 4th reactor. The last reactor was fed with the decanted reaction mixture from the 3rd reactor and with 32 parts of fresh cyclohexane.

The solution of peroxides in cyclohexane was extracted from the decanting vessel situated at the outlet of the 2nd reactor and it contained 18% by weight of peroxides of cyclohexanone, and 0.9% of caprolactone. The reaction mixture extracted from the decanting vessel situated at the outlet of the 4th reactor contained 22.9% of caprolactone and was practically free of peroxides (less than 0.1% by weight). It was treated as in Example XV, in order to recover the ε-caprolactone therefrom.

The examples described embody the invention in preferred form, but it is intended that they be considered as illustrative rather than definitive of the invention. The invention is defined in the claims.

I claim:
1. A method for producing the derivatives of 6-hydroxycaproic acids, which comprises reacting a cyclohexanone with hydrogen peroxide and formic acid at a temperature in the range of 0°–100° C., said cyclohexanone having the formula:

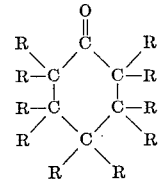

wherein R is selected from the group consisting of hydrogen, aliphatic alkyl radicals, and cyclic alkyl radicals, the molar ratio of formic acid to hydrogen peroxide used in the reaction being at least about 1 and the molar ratio of hydrogen peroxide to cyclohexanone used in the reaction being between about 0.1 to about 2, and recovering said derivatives of 6-hydroxycaproic acids containing predominately ε-caprolactone and 6-formyloxy caproic acid having the following formulas respectively:

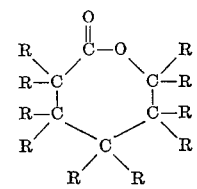

and

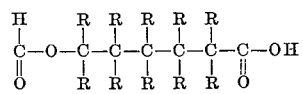

wherein R corresponds to that of the cyclohexanone.

2. The method according to claim 1 wherein the reaction is carried out at a temperature in the range of 40°–90° C., said cyclohexanone having the formula:

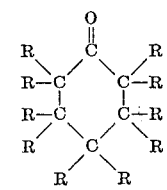

wherein R is selected from the group consisting of hydrogen, aliphatic alkyl radicals, and cyclic alkyl radicals, and said derivatives of 6-hydroxy caproic acids recovered therefrom contain predominately 6-formyloxy caproic acid having the formula:

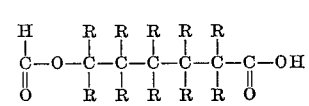

wherein R corresponds to that of the cyclohexanone.

3. The method according to claim 1 wherein the hydrogen peroxide is added gradually to a mixture of formic acid and the cyclohexanone, and the derivatives of 6-hydroxycaproic acid recovered therefrom contain predominately 6-formyloxycaproic acid having the formula:

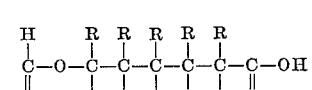

wherein R corresponds to that of the cyclohexanone.

4. The method according to claim 3 wherein the hydrogen peroxide is an aqueous solution containing about 30% to 90% by weight of H₂O₂ and is added gradually to a mixture of a cyclohexanone and formic acid at a temperature in the range of 40°–90° C., said cyclohexanone having the structural formula:

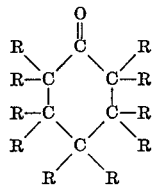

wherein R is selected from the group consisting of hydrogen aliphatic alkyl radicals, and cyclic alkyl radicals, the molar ratio of $H_2O_2$ to the cyclohexanone used in the reaction being about 0.5 to 1.25, said formic acid having a concentration of 75%–100% with the molar ratio of formic acid to $H_2O_2$ used in the reaction being 5 to 30.

5. The method according to claim 4 wherein the time required to add the hydrogen peroxide is about ½ hour to 2 hours and the time required for completing the reaction is about 1½ hours to 4 hours.

6. The method according to claim 1 wherein the formic acid is reacted with the hydrogen peroxide for a period sufficient to allow at least 20% of hydrogen peroxide to react with said formic acid at a temperature in the range of 0°–40° C., prior to the addition of said cyclohexanone, and the derivatives of said 6-hydroxycaproic acids recovered contain predominately ε-caprolactone.

7. The method acording to claim 1 wherein the formic acid is reacted with the hydrogen peroxide for a period sufficient to allow at least 20% of said hydrogen peroxide to react with said formic acid to form a peracid, prior to the addition of the cyclohexanone to said reaction medium at a temperature in the range of 0°–40° C., the molar ratio of cyclohexanone to said hydrogen peroxide used in the reaction is about 0.7 to 2, and the product recovered is predominately ε-caprolactone.

8. A method of producing the derivatives of 6-hydroxycaproic acid, said method comprising reacting formic acid with hydrogen peroxide in a reaction medium containing said reactants in the molar ratio of 2 to 30 mols of formic acid to one mol of hydrogen peroxide to produce performic acid, adding a cyclohexanone to said reaction medium at a temperature between 10°–30° C. after about 20% to 80% of said hydrogen peroxide having been reacted, said cyclohexanone having a structural formula:

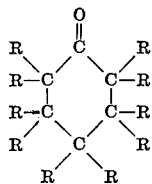

wherein R is selected from the group consisting of hydrogen, aliphatic alkyl radicals, and cyclic alkyl radicals, the molar ratio of cyclohexanone to said hydrogen peroxide used in the reaction being about 0.7 to 2, and immediately separating the resultant derivatives of 6-hydroxycaproic acids containing predominately ε-caprolactone having the structural formula:

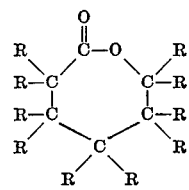

wherein R corresponds to that of the cyclohexanone.

9. A method of producing the derivatives of 6-hydroxycaproic acids, said method comprising reacting formic acid with hydrogen peroxide in an aqueous medium containing a 30% to 90% hydrogen peroxide solution and a 75% to 100% formic acid solution in molar ratio of 2 to 30 mols of formic acid to one mol of hydrogen peroxide to produce performic acid at a temperature between 0° to 40° C., adding a cyclohexanone to said reaction medium after about 20% to 80% of said hydrogen peroxide having been reacted while maintaining said reaction medium at a temperature between 0° to 40° C., said cyclohexanone having a structural formula:

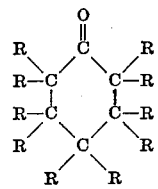

wherein R is selected from the group consisting of hydrogen, aliphatic alkyl radicals, and cyclic alkyl radicals, the molar ratio of cyclohexanone to said hydrogen peroxide used in the reaction being about 0.7 to 2, and immediately separating the resultant derivatives of 6-hydroxycaproic acids containing predominately ε-caprolactone having the structural formula:

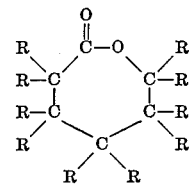

wherein R corresponds to that of the cyclohexanone.

10. The method according to claim 5 wherein the cyclohexanone has the following formula:

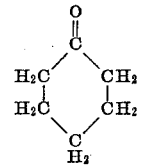

and the product is predominately 6-formyloxy caproic acid.

11. The method according to claim 5 wherein the cyclohexanone is 3,3,5 trimethyl cyclohexanone, and the product is predominately 3,3,5 trimethyl caprolactone, 3,5,5 trimethyl caprolactone, 6-formyloxy 3,5,5 trimethyl caproic acid and 6-formyloxy 3,3,5 trimethyl caproic acid.

12. The method according to claim 9 wherein the cyclohexanone has the following formula:

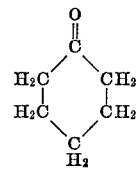

13. The method according to claim 9 wherein the cyclohexanone is a mixture of 2-methyl and 4-methyl cyclohexanone, and the product is predominately methyl-ε-caprolactones.

14. The method according to claim 9 wherein the cyclohexanone is a trimethyl cyclohexanone, and the product is predominately trimethyl-ε-caprolactones.

15. A method of producing the derivatives of 6-hydroxycaproic acids, said method comprising reacting a cyclohexanone with hydrogen peroxide and formic acid in the presence of a solvent for peroxide of said cyclohexanone and which is substantially insoluble in and immiscible with the reaction mixture at a temperature in the range of 0°–100° C., said cyclohexanone having the formula:

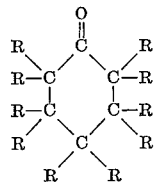

wherein R is selected from the group consisting of hydrogen, aliphatic alkyl radicals, and cyclic alkyl radicals, the molar ratio of formic acid to hydrogen peroxide used in the reaction being at least about 1, the molar ratio of hydrogen peroxide to cyclohexanone used in the reaction being between about 0.1 to about 2, and the amount of said solvent used is about 0.1–1.0 times the weight of said formic acid, and recovering said derivatives of 6-hydroxycaproic acids containing predominately ε-caprolactone and 6-formyloxy caproic acid having the following formulas respectively:

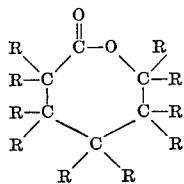

and

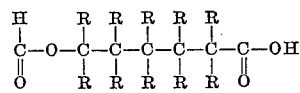

wherein R corresponds to that of the cyclohexanone and a small amount of peroxides of the cyclohexanone.

16. The method according to claim 15 wherein the formic acid is allowed to react with the peroxide prior to their reaction with the cyclohexanone in the presence of the solvent for peroxides of cyclohexanone, and the solvent for said peroxides of cyclohexanone is separated from the reaction mixture prior to the recovery of the derivative of 6-formyloxy caproic acids containing predominately ε-caprolactone.

17. The method according to claim 15 wherein the formic acid is reacted with the peroxide for a period sufficient to convert at least 20% of the hydrogen peroxide to said peracid prior to their reaction with the cyclohexanone in the presence of the solvent for peroxides of cyclohexanone, the product thus obtained in the reaction mixture is separated from the solvent containing the peroxides of cyclohexanone, and an additional solvent for said peroxide of cyclohexanone is used to extract the peroxides of cyclohexanone remaining in the reaction mixture.

18. The method according to claim 17 wherein the formation of the peracid and the reaction of the peracid with the cyclohexanone in the presence of said solvent is carried out in separate zones in a continuous manner which comprises forming the peracid and feeding the peracid to a reaction zone containing the cyclohexanone and in the presence of a diluent in the form of a solvent for the oxidation of said cyclohexanone, separating the aqueous reaction mixture from the solvent, and contacting the thus recovered aqueous reaction mixture with additional solvent for said peroxides of cyclohexanone to remove the peroxides of cyclohexanone therein.

19. The method of claim 18 wherein the additional solvent used for the removal of peroxides of cyclohexanone is recovered and used as said diluent.

References Cited

UNITED STATES PATENTS 3,064,008   11/1962   Phillips et al. _____ 260—343

OTHER REFERENCES

Fieser, et al., Advanced Organic Chemistry (Reinhold, New York, 1962), pp. 160, 161, 427–9.

JOHN D. RANDOLPH, *Primary Examiner.*

C. M. SHURKO, *Assistant Examiner.*

U.S. Cl. X.R.

260—488, 502, 586, 561, 465.4, 484

UNITED STATES PATENT OFFICE

CERTIFICATE OF CORRECTION

Patent No. 3,428,656  February 18, 1969

Francis J. Weiss

It is certified that error appears in the above identified patent and that said Letters Patent are hereby corrected as shown below:

Column 3, line 12, "direction" should read -- direct --.
Column 5, line 64, "perforic" should read -- performic --.
Column 11, line 40, "ε-formyloxycaproic" should read -- 6-formyloxycaproic --. Column 12, lines 16 and 51, column 13, lines 12 and 56, column 14, line 19, and column 15, line 11, cancel "aliphatic", each occurrence.

Signed and sealed this 31st day of March 1970.

(SEAL)
Attest:

Edward M. Fletcher, Jr.
Attesting Officer

WILLIAM E. SCHUYLER, J.
Commissioner of Patent